United States Patent [19]

Wehner

[11] Patent Number: 5,467,664
[45] Date of Patent: Nov. 21, 1995

[54] NOISE ABATING VEHICLE TRANSMISSION SHIFT LEVER

[75] Inventor: Timothy D. Wehner, Port Huron, Mich.

[73] Assignee: Black River Manufacturing, Inc., Port Huron, Mich.

[21] Appl. No.: 97,134

[22] Filed: Jul. 26, 1993

[51] Int. Cl.[6] .............................. G05G 1/04; G05G 25/02
[52] U.S. Cl. .......................... 74/523; 74/473 R; 403/225
[58] Field of Search .......................... 74/473 R, 473 P, 74/523; 403/225, 226, 372

[56]         References Cited

U.S. PATENT DOCUMENTS

| 1,927,646 | 9/1933 | Miller .................................. 74/473 P |
| 3,657,943 | 4/1972 | Bruhn, Jr. et al. ........................ 74/524 |
| 3,693,467 | 9/1972 | Oehl .................................... 74/473 R |
| 4,492,129 | 1/1985 | Hasegawa ............................. 74/473 R |
| 4,569,246 | 2/1986 | Katayama et al. ..................... 74/473 R |
| 4,603,598 | 8/1986 | Tsuji et al. ............................. 74/473 P |
| 4,636,106 | 1/1987 | Waisbrod .............................. 403/225 X |
| 4,768,393 | 9/1988 | Beaman ................................. 74/473 R |
| 4,960,009 | 10/1990 | Schultz et al. ........................ 74/473 R |
| 5,189,925 | 3/1993 | Neal et al. ............................. 74/473 R |

FOREIGN PATENT DOCUMENTS

| 58-168114 | 10/1983 | Japan ................................. 74/473 R |
| 62-102312 | 5/1987 | Japan ................................. 74/473 R |
| 2-85557 | 3/1990 | Japan ...................................... 74/523 |
| 4-140551 | 5/1992 | Japan ...................................... 74/523 |
| 2190967 | 12/1987 | United Kingdom ................. 74/473 R |

*Primary Examiner*—Richard M. Lorence
*Attorney, Agent, or Firm*—Robert A. Brown

[57]             ABSTRACT

A noise abating gear shift mechanism for an automotive transmission. The mechanism includes a gear shift lever, an insert member disposed within the gear shift lever releasably connected to the transmission, and a homogeneous resilient member surrounding the insert member. The gear shifting mechanism is effective to absorb transmission noise and vibration as well as maintain sufficient rigidity to provide firm shift capability.

13 Claims, 1 Drawing Sheet

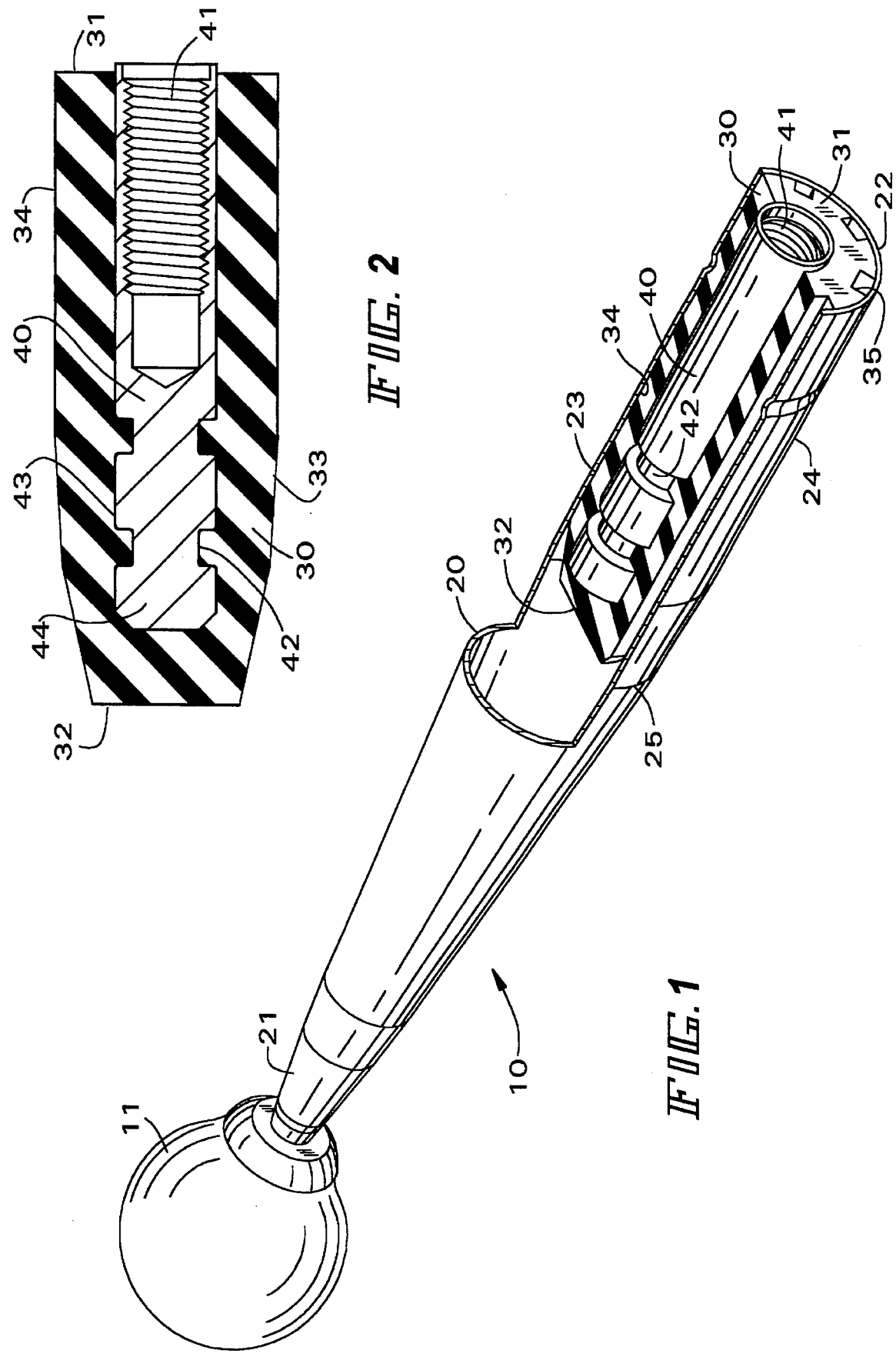

NOISE ABATING VEHICLE TRANSMISSION SHIFT LEVER

BACKGROUND OF THE INVENTION

The present invention relates generally to gear shifting mechanisms of vehicles that are primarily equipped with manual transmissions. More particularly, the present invention is concerned with automotive transmission gear shift levers operable to counteract the effect of noise generated by engagement and disengagement of gears of a vehicle transmission. The gear shift lever is effective to absorb and minimize transmission gear noise and vibration so as to provide an acceptable and pleasant environment within the passenger compartment of a vehicle.

DESCRIPTION OF THE PRIOR ART

Manual transmissions rely on a number of gears which are directly coupled to the engine, through a generally non-slipping friction clutch, for power transmission. Because of this direct connection between engine and transmission any vibrations or noise generated at the engine are easily transmitted to the transmission and through the shifting mechanism to the passenger compartment.

During vehicle operation the objectionable vibrations and noise most often manifest themselves either as a continuous "humming" or "buzzing" noise in the passenger compartment or a shaking of the shifting lever, or both. The shaking of the shifting lever can become violent enough that the gear shifting pattern that normally is imprinted on the hand grip of the shifting lever becomes indistinguishable.

Another problem associated with manual transmissions is that of firmness of feel during shifting. By firmness of feel is meant that under a certain force applied at the grip by the driver to move the selector to the desired position the shifting lever assembly deflects. Depending on the amount of deflection the shifting mechanism may be characterized as firm or stiff or at the other extreme as unacceptably soft.

To reduce the noise and vibrations that are transmitted through the shifting mechanism, various attempts have been made at either isolating the shifting mechanism or by providing some vibration and noise dampening means between elements of the shifting mechanism. The Miller U.S. Pat. No. 1,927,646 discloses the use of a sound insulating medium between various elements of a multi-element shifting lever. Bruhn et al, in U.S. Pat. No. 3,657,943, also disclose the use of an insulating lining between elements of the shifting mechanism; but like Miller, they rely on an additional retainer between the lining and the upper element of the shifting lever. These and other similar approaches, however, have been only marginally successful in reducing passenger compartment noise and vibration and in no way do they address the concept of "shift feel". More recently, proposed solutions have involved noise absorbing or noise isolating means which involve multi-part elements. The Katayama et al U.S. Pat. No. 4,569,246 discloses the use of multiple soft rubber rings packed between the lower shifting element and the upper shifting element. Additionally, at least one hard rubber ring is utilized to limit the deflection of the soft rubber rings. In Beaman, U.S. Pat. No. 4,768,393, there is also disclosed a coupling arrangement between upper and lower shifting means consisting of a series of elastomeric and thermoplastic elements. The thermoplastic elements serve the purpose of limiting the deflection of the elastomeric elements.

According to the teachings in the prior art, effective solutions to the noise and vibration transmission problem require the use of elastomeric insulators having a low material hardness along with a low modulus of elasticity. These low-hardness, rather elastic insulators, however, produce a very soft shift feeling, which generally is unacceptable. As the hardness of the rubber or elastomeric insulator is increased to improve "shift feel", noise and vibration insulating characteristics deteriorate. It is for this reason that a great deal of the recent art discloses independent solutions to the two problem areas; i.e., certain elements of the shifting mechanism are utilized to produce noise and vibration insulation whereas other much more rigid elements are used to improve "shift feel".

SUMMARY OF THE INVENTION

It is a primary object of the present invention to provide a shifting lever mechanism that effectively absorbs noise and vibration from a vehicle transmission so as to maintain an acceptable quiet environment within the passenger compartment of the vehicle.

It is a further object of the present invention to provide a shifting lever mechanism that improves noise and vibration abatement while simultaneously providing the means to achieve a desirable degree of "shift feel".

It is an additional object of the present invention to provide a shifting lever mechanism that achieves a very high degree of noise and vibration abatement by utilizing a very unique structure that includes a single homogeneous elastomeric insulator.

The aforementioned objects and others are achieved by means of a very simple assembly comprising an upper formed hollow tubular shifting lever, a lower transmission coupling insert of significantly smaller diameter than the diameter of the upper hollow tubular element, and a one-piece homogeneous resilient element separating the other two elements of the assembly. The desired improvements result from the utilization of special dimensions of the elements of the shifting lever assembly. Specifically, the volume and hardness of the resilient homogeneous element must meet certain minimum criteria. The length of the resilient element, and more importantly, the length of the interface between the resilient element and the hollow tubular shifting lever as a fraction of the total length of the hollow tubular shifting lever must exceed a certain minimum value. Additionally, the diameter of the resilient element must be roughly double the diameter of the transmission coupling insert.

A shifting lever assembly constructed in accordance with the present invention comprises a tubular outer element disposed to receive at one end a grip for operating the shifting lever into a plurality of desired shifting positions and having an open other end, attachment means for securing the lever mechanism to a vehicle transmission and adaptable for being securely inserted into the open end of the tubular outer element, and a homogeneous resilient member that completely surrounds the attachment means so that no portion thereof is exposed except for its end that is attached to the vehicle transmission, the resilient member having volume, material hardness and dimensional characteristics that combine to effectively reduce and minimize noise transmission and simultaneously maintain firm shift capability.

BRIEF DESCRIPTION OF THE DRAWING

The foregoing and other characteristics, objects, features and advantages of the present invention will become more apparent upon consideration of the following detailed description having reference to the accompanying figures of the drawing, wherein:

FIG. 1 is a three dimensional view of the upper shifting lever assembly showing an embodiment that achieves the several objects of the invention.

FIG. 2 is a cross sectional view of the lower transmission coupling insert surrounded and encapsulated by the resilient insulator.

DESCRIPTION OF A PREFERRED EMBODIMENT

Referring now to FIGS. 1 and 2 of the drawing, a detailed embodiment of the present invention is shown therein. In FIG. 1, an entire shifting lever assembly is generally identified by reference numeral 10. A grip 11 is employed by a driver to manipulate the shifting mechanism in order to make a desired and proper gear selection. An elongate hollow tubular upper shifting lever is referred to by numeral 20. Various elements of the upper shifting lever 20 are hereinafter identified by numerals 21 through 25. A small diameter end 21 of the hollow tubular lever assembly 10 is disposed to receive the grip 11. An open end 22 of the hollow tubular shift lever 20 has an effective diameter 24 which is maintained for about one third of the length of the tubular shifting lever 20. At point 25, located on the outer circumferential surface of the tubular shifting lever 20, the diameter thereof gradually decreases toward the small end 21, whereat the shifting lever 20 becomes essentially solid. The open end 22 of the tubular shifting lever 20 is designed so as to accommodate and secure therein a resilient insulator 30. Various features of the resilient element 30 are hereinafter identified by reference numerals 31 through 35. An inner, hidden end 32 of the resilient element 30 is shaped in the form of a truncated cone. In contradistinction, an outer, exposed end 31 is shaped in the form of a cylinder. A relatively short transitional blending section 33 joins the lower cylindrical portion 31 with the upper truncated cone section 32. An outer peripheral surface 34 of resilient member 30 is heat or chemically bonded, or otherwise suitably attached to the inner circumferential surface 23 of the tubular shift lever 20. A plurality of longitudinal grooves 35 are located on the outside surface 34 of the resilient member 30. The resilient member 30 substantially surrounds and encapsulates a lower transmission coupling insert 40, which is operable to be releasably attached directly to a vehicle transmission. In the present embodiment, a coupling between the shift lever assembly 10 and a transmission is achieved by means of a threaded connection identified by reference numeral 41. Clearly, other means can be used without deviating from the scope of the invention. The resilient element 30 is molded completely around the coupling insert 40 so that no part of the insert is exposed except for an open threaded end 41. A plurality of grooves 42 may be machined on an outside diameter 43, at a solid end 44 of the coupling insert 40 to more fixedly secure, enhance and adjust the connection for fine tuning shift feel characteristics between the resilient element 30 and the transmission coupling insert 40.

In the concept of the present invention, it has been determined that for a shift lever assembly of approximately 300 millimeters in length, a typical transmission coupling insert 40 will have a diameter of approximately 17 to 19 millimeters. To ensure that noise and vibrations are not transmitted into the passenger compartment, the diameter of the resilient element 30 must be approximately twice the diameter of the coupling insert. Additionally, for good performance, the length of the resilient member 30 must measure or exceed 100 millimeters in length. To ensure noise and vibration insulation, a section of resilient material, approximately equal in length to one tenth (0.10) of the length of the resilient element 30, must be provided at the end of the solid section of the transmission insert so that vibrations travelling vertically through the transmission coupling insert are dampened by the resilient section.

With regard to the matter of "shift feel" it has been determined that when using basically a soft resilient element the two factors that control "shift feel" are the volume of the resilient material and the length of contact between the resilient element and the hollow shift lever. Since, according to the present invention, the interfaces between the transmission insert 40, the resilient element 30 and the outer tubular shift lever 20 are not subject to change due to operating conditions when a force is applied to the grip by a driver in order to effect a selection of the appropriate transmission gears, this force will produce a deflection of the system. Obviously, because the resilient element is much more elastic than the other metallic elements of the shifting assembly, most of the deflection will occur as the resilient element is compressed. Increased deflection results in poor "shift feel". However, since generally each different driver would apply approximately the same force to the grip, an increased amount of elastic material will necessarily mean that the force per unit of volume or mass will decrease, resulting also in reduced deflection, thus improving "shift feel". Additionally, if the length of contact between the resilient element and the outer hollow shifting lever is increased, the distance between the point of force application at the grip and the point of application of the reaction force (at approximately a middle position of the resilient element) decreases, thus resulting in reduced deflection of the shifting lever assembly.

When using natural rubber or its equivalent, a durometer hardness of 40 is preferred to achieve a reasonable balance between noise and vibration insulation and "shift feel". When longer shift lever assemblies are employed, rubber or similar material having a higher durometer hardness must be utilized in order to maintain the deflection characteristics that are required to achieve good "shift feel".

The longitudinal grooves 35 formed along the outside surface of the resilient element 30, the number of which as well their dimensional characteristics can be modified or changed to suit a particular application, serve the purpose of fine tuning the "shift feel" characteristics. As the number of grooves increases, or as the depth and width of each groove is increased, the firmness of the "shift feel" will decrease. Other types of surface grooves or cross sectional changes could be used to achieve the stated objectives without deviating from the scope of the present invention.

While the invention has been described with reference to a particular embodiment, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A shifting lever for an automotive transmission comprising, elongate tubular element means having a predetermined length for operating said transmission and having a first substantially closed end for receiving grip means and having a second open end which has disposed therein internal cavity means, said internal cavity means having a first end formed in the shape of an upper truncated cone section, an intermediate tapered section and a lower section of substantially constant diameter, said internal cavity means formed to provide a smooth, uninterrupted inner shell throughout its circumferential surface, attachment means disposed within said cavity means for connecting said shifting lever to the transmission, homogeneous resilient member means disposed about and substantially encapsulating said attachment means within said cavity means, said resilient member means having a preselected volume, a preselected hardness and formed to provide a continuous peripheral surface for assembly within said cavity means, said resilient member means having a plurality of longitudinal grooves formed therein, and wherein said preselected volume, preselected hardness and plurality of longitudinal grooves of said resilient member means cooperate to effectively absorb and minimize noise and vibration received from said transmission so as to achieve a predetermined shifting lever rigidity and a desired shift feel capability.

2. A shifting lever for an automotive transmission as claimed in claim 1, comprising coupling means for connecting said attachment means to said transmission, said resilient member means having a length equal to at least ten percent more than the length of said attachment means for providing a section of dampening material at an inner end of said cavity means of said tubular element means so as to prevent transmission vibrations between said coupling means and said shifting lever.

3. A shifting lever for an automotive transmission as claimed in claim 2, wherein said coupling means comprises a threaded connection.

4. A shifting lever for an automotive transmission as claimed in claim 1, wherein said resilient member means is made from natural rubber having a durometer hardness of at least 40 and not more than 55.

5. A shifting lever for an automotive transmission as claimed in claim 1, wherein said attachment means has formed thereabout at least one circumferential groove for adjusting said predetermined shifting lever rigidity to achieve a desired shift feel capability.

6. A shifting lever for an automotive transmission as claimed in claim 1 comprising:

said resilient member means having an overall diameter approximately twice the diameter of said attachment means, 7. A shifting lever for an automotive transmission as claimed in claim 1 comprising said tubular element means having a length less than 300 millimeters and said resilient member means having a length at least one third the length of said tubular element means.

8. A shifting lever for an automotive transmission as claimed in claim 1 comprising said tubular element means having a length of more than 300 millimeters and said resilient member means having a length of at least one quarter the length of said tubular element means.

9. A shifting lever for an automotive transmission as claimed in claim 1, wherein said resilient member means has a length equal to at least ten percent more than the length of said attachment means for providing a barrier section of dampening material at an inner end of said attachment means so as to prevent transmission vibrations between said transmission and said shifting lever.

10. An insert member for installation in an automotive transmission shift lever wherein, said insert member comprises outer resilient member means and inner attachment means, said resilient member means shaped generally cylindrically having a closed end and an open end providing a preselected volume and formed from material of a predetermined hardness, said resilient member means having a truncated cone section at said closed end, an intermediate tapered section and a section of substantially constant diameter terminating at said open end, said resilient member means having a continuous outer circumferential surface adaptable for installation in said transmission shift lever, said resilient member means having a plurality of longitudinal grooves formed therein, said inner attachment means disposed within and substantially encapsulated by said resilient member means and having an exposed free end, and connection means disposed at said free end of said attachment means for releasable securement of said shift lever to an automotive transmission so as to provide a predetermined rigidity in said shift lever and thereby achieve a desired shift feel capability.

11. An insert member for installation in an automotive shift lever as claimed in claim 10, wherein said resilient member means has a length equal to at least ten percent more than the length of said inner attachment means for providing a section of dampening material between said closed end of said resilient member and an inner end of said inner attachment means.

12. An insert member for installation in an automotive shift lever as claimed in claim 10, wherein said resilient member means is made from natural rubber having a durometer hardness of at least 40 and not more than 55.

13. An insert member for installation in an automotive shift lever as claimed in claim 10, wherein said resilient member means has formed on its outer perimeter at least one circumferential groove for adjusting said rigidity in said shift lever to achieve said desired shift feel capability.

* * * * *